United States Patent [19]

Iyengar

[11] 4,410,344

[45] Oct. 18, 1983

[54] OPTICAL WAVEGUIDE FIBER DRAW GUIDING AND COATING METHOD AND APPARATUS

[75] Inventor: Rama Iyengar, Lilburn, Ga.

[73] Assignee: Western Electric Company, Inc., New York, N.Y.

[21] Appl. No.: 306,561

[22] Filed: Sep. 28, 1981

[51] Int. Cl.³ .................... C03B 37/025; C03B 37/07
[52] U.S. Cl. .......................................... 65/3.11; 65/2; 65/13; 65/29; 65/160; 427/8; 427/163; 118/672
[58] Field of Search .................. 65/2, 3.11, 12, 13, 65/29, 158, 160; 427/8, 10, 163; 118/672, 676

[56] References Cited

U.S. PATENT DOCUMENTS

| | | | |
|---|---|---|---|
| 2,725,847 | 12/1955 | Gramatke | 118/125 |
| 2,748,886 | 6/1956 | Wildebour | 118/405 X |
| 4,123,242 | 10/1978 | Imoto et al. | 65/13 X |
| 4,124,728 | 11/1978 | Marcuse et al. | 427/8 |
| 4,174,842 | 11/1979 | Partus | 65/2 X |
| 4,317,666 | 3/1982 | Faure et al. | 65/2 |
| 4,321,072 | 3/1982 | Dubos et al. | 65/3.11 |
| 4,331,463 | 5/1982 | Briere et al. | 65/13 |

Primary Examiner—Richard V. Fisher
Attorney, Agent, or Firm—David P. Kelley

[57] ABSTRACT

A method of uniformly coating an optical waveguide fiber 10 comprises the steps of suspending an elongated glassy optical fiber preform 11 in an upright orientation from a preform holder that includes a collet 14 to which an x-y translator 15 is coupled, heating the preform, and drawing fiber from the bottom of the heated preform. The drawn fiber is passed through a tubular coating applicator 32 located beneath the preform, and the position of the fiber is sensed as it is being drawn. In response to sensed deviations in fiber position from along a preselected path that extends through the tubular coating applicator along the applicator axis, the preform is repositioned by horizontal movement of the preform holder so as to return the drawn fiber to the preselected path and thereby maintain its travel through the coating applicator substantially along the applicator axis.

13 Claims, 3 Drawing Figures

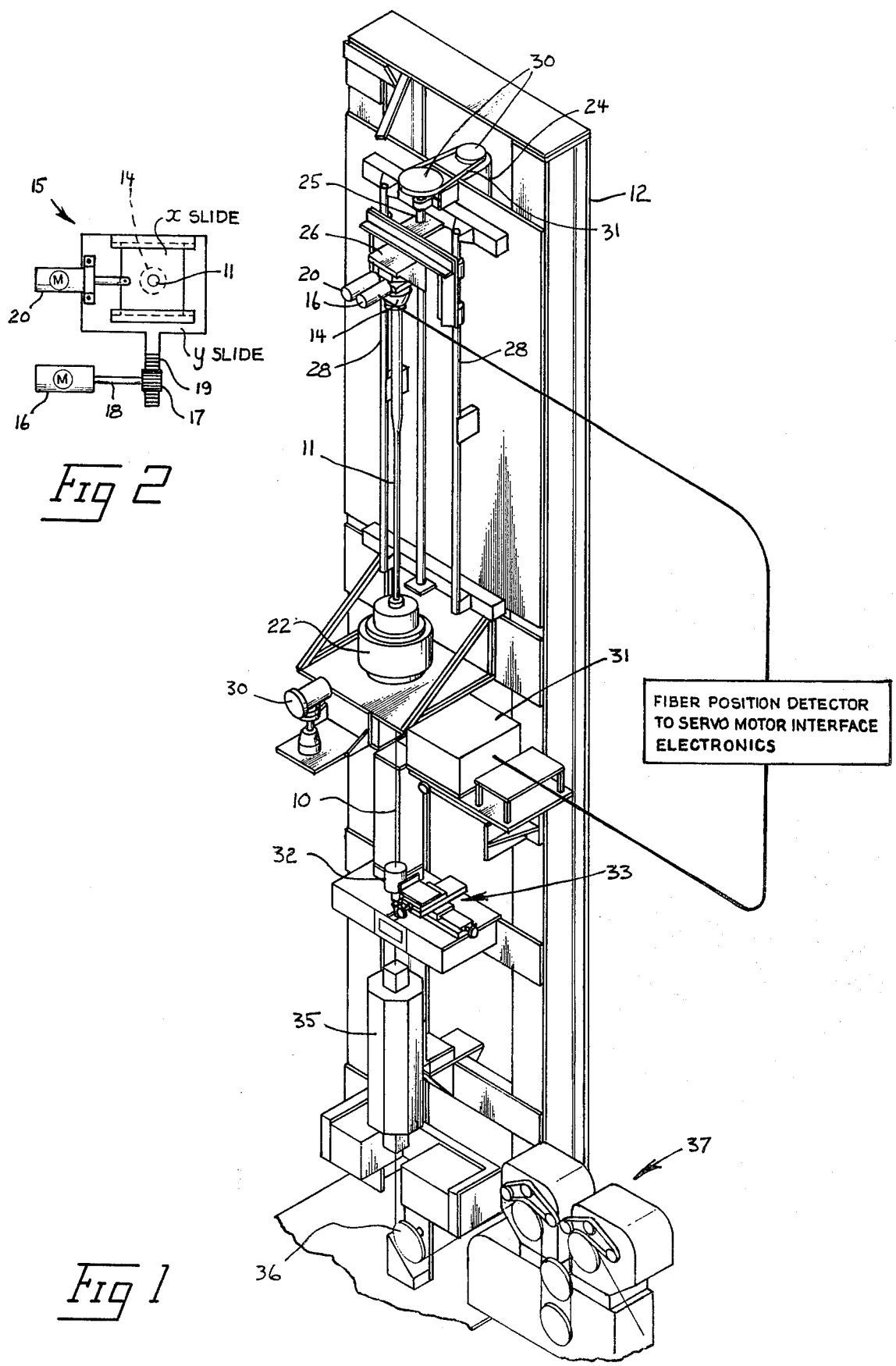

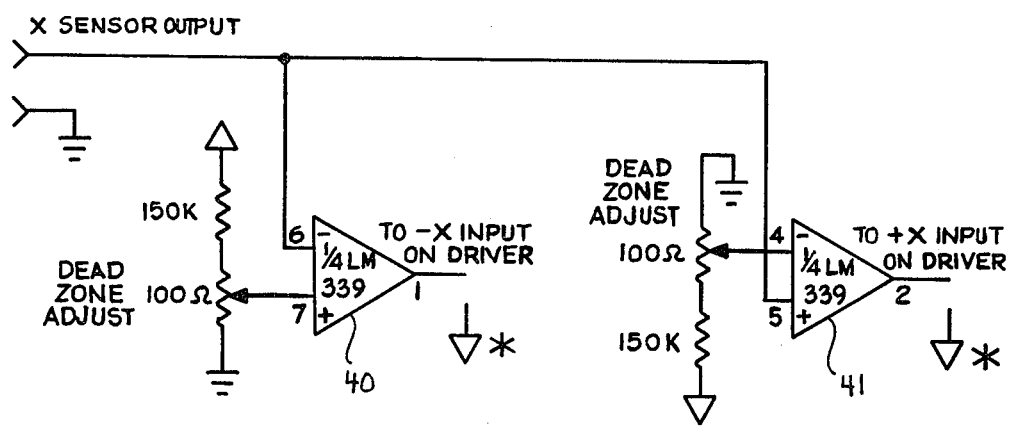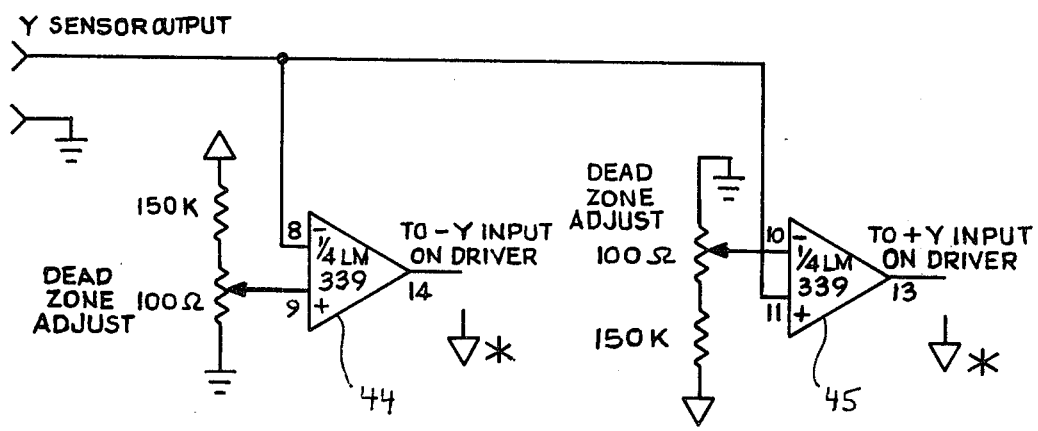
△ = +15V CONNECT TO PIN 3 ON LM 339
▽ = -15V CONNECT TO PIN 12 ON LM 339
✻ CONNECT LOGIC GROUND (0V) ON DRIVER TO -15V
Fig 3

OPTICAL WAVEGUIDE FIBER DRAW GUIDING AND COATING METHOD AND APPARATUS

TECHNICAL FIELD

This invention relates to methods and apparatuses for guiding and coating optical fibers as they are drawn during fiber manufacture from optical waveguide fiber preforms.

BACKGROUND OF THE INVENTION

In the manufacture of optical waveguides a fiber is typically drawn from a symmetrically heated, rod-shaped, glassy preform with the fiber yielding a faithful replica of the preform in cross section. This is done by feeding the preform downwardly into a furnace and drawing the fiber from molten material formed at the bottom of the heated preform. The fiber is then passed downwardly through a coating applicator where a thin layer of coating material is applied to the fiber. This coating serves to prevent airborne particles from impinging upon and adhering to the surface of the just drawn glass fiber itself which would weaken it. The coating also shields the fiber from surface defects inflicted by subsequent manufacturing processes and installation handling. The fiber is then routed through a curing oven where the coating is cured and then onto a takeup reel via a system of sheaves and capstans. For a more detailed description of such a fiber drawing process reference may be had to the article titled "Drawing Lightguide Fiber" by David H. Smithgall and Daryl L. Myres that appears on pages 49–61 of the Winter 1980 issue of THE WESTERN ELECTRIC ENGINEER.

In conducting the just described fiber draw process it is important that the fiber be moved precisely along a preselected path. Deviations from this path may result in the fiber actually contacting an edge of the relatively small opening at the bottom of the furnace, which opening is purposely made quite small to minimize the intake of ambient air or gases. Furthermore, deviations from the preselected path through the coating applicator may well result in the coating not being applied concentrically to the fiber. In other words, the coating may be thicker to one side or the other. If the coating is badly nonconcentric the fiber may be directly exposed to ambient atmosphere; even where the coating is only marginally nonconcentric fiber alignment for connectorization becomes poor creating significant transmission losses at interconnect points. In addition, where a diameter gauge is employed in the draw machine it too cannot operatively tolerate substantial misalignment of the fiber.

The difficulty in maintaining the movement of the fiber along a preselected path beneath the glassy fiber preform arises primarily from the fact that the point of emergence of the fiber from the necked down molten mass at the bottom of the preform tends to wander or drift. A prime reason for this drift is the non-straightness of the starting preform.

Heretofore, little has been done to alleviate the fiber guidance problem just described. As a static alignment measure optical fiber preforms, that have been manufactured with some degree of arc, have been straightened by heating the preform to its softening point locally and mechanically straightening the preform with graphite paddles. Such straightening does tend to center the point of emergence better as the preform is consumed in the drawing process. However, this method may introduce additional flaws on the surface of the preform due to contact with the graphite paddles.

SUMMARY OF THE INVENTION

In one form of the invention a method of guiding an optical waveguide fiber being drawn from an optical waveguide fiber preform comprises the steps of sensing an actual position of the fiber, comparing the sensed position with a preselected position located along a preselected path of fiber travel, and moving the preform in response to deviations in the sensed position from the preselected position so as to maintain the fiber travelling substantially along the preselected path.

In another form of the invention a method of uniformly coating an optical waveguide fiber comprises the steps of positioning an elongated glassy optical fiber preform in an upright orientation, heating the preform, drawing fiber from the bottom of the heated preform and passing the drawn fiber through a tubular coating applicator located beneath the preform. The method further comprises the steps of sensing the position of the fiber being drawn from the preform and repositioning the preform in response to sensed deviations in fiber position from along a preselected path that extends through the tubular coating applicator along the applicator axis so as to return the drawn fiber to the preselected path and thereby maintain its travel through the coating applicator substantially along the applicator axis.

In another form of the invention apparatus for guiding an optical waveguide fiber as it is drawn from a heated optical fiber preform comprises means of sensing an actual position of the fiber, means for comparing the sensed position with a preselected position located along a preselected path of fiber travel, and means for repositioning the preform in response to deviations in the sensed position from the preselected position so as to maintain the fiber travelling substantially along the preselected path.

In yet another preferred form of the invention apparatus for uniformly coating an optical waveguide fiber as it is drawn from an optical fiber preform comprises means for sensing the position of the fiber as it is drawn from the preform and tubular applicator means for applying liquid coating material to the fiber as it passes therethrough. The apparatus further comprises means for repositioning the preform in response to sensed deviations in fiber position from along a preselected path that extends through the tubular coating applicator along the applicator axis so as to return the drawn fiber to the preselected path and thereby maintain its travel through the coating applicator substantially along the applicator axis.

BRIEF DESCRIPTION OF THE DRAWING

FIG. 1 is a perspective view of apparatus being used in drawing optical waveguide fiber from an optical waveguide fiber preform in accordance with principles of the present invention;

FIG. 2 is a plan view of an x-y translator employed in the apparatus illustrated in FIG. 1; and FIG. 3 is a schematic diagram of interface electronic circuitry used in the apparatus shown in FIG. 1.

DETAILED DESCRIPTION

Referring now in more detail to the drawing, there is shown in FIG. 1 apparatus being used in drawing an optical waveguide fiber 10 from an optical waveguide fiber preform 11. The apparatus comprises an upright tower 12 which supports various elements of the drawing apparatus. These elements include a collet 14 mounted to the x-slide member of an x-y translator 15 shown in greater detail in FIG. 2. The x-y translator conventionally comprises a motor 16 having mounted to its output shaft 18 a pinion 17 in mesh with a rack 19 that extends from a y-slide. The translator has another motor 20 mounted to the y-slide itself with its output shaft connected to the x-slide slidably supported on the y-slide. So constructed, the collect, from which the preform 11 is suspended, may be moved about by motors 16 and 20 in a horizontal plane.

The optical fiber draw apparatus further comprises means for feeding the preform downwardly into a zirconia RF induction heating furnace 22. This feeding means includes a motor 24 mounted to the tower 12 which rotates a screw 25 that slides a carriage 26 upon a pair of rails 28. Power transmission between the screw and motor is provided by a pair of pulleys 30 and a belt 31. Operation of the motor causes the screw 25 to turn and thereby lower the carriage 26 to which the x-y translator, collet and preform are supported.

The apparatus further includes a pyrometer 30 used in measuring and controlling the temperature of the zirconia furnace 22. An optical fiber position detector 31 is mounted to the tower beneath the furnace. The detector here is conventionally comprised of two Model 1233 United Detector Technology position sensing photodetectors mounted along x and y axes beside the fiber and a Uniphase Model 1103 He-Ne laser for emitting a beam of light onto the fiber at a 45° angle with respect to each axis. Each photodetector generates an electronic signal proportional to the position of the fiber along its designated axis.

The apparatus further includes a coating applicator 32 mounted to another x-y positioner 33 supported upon the tower 12 beneath the furnace 22 and the fiber position detector 31. An ultraviolet curing oven 35 is mounted to the tower beneath the coating applicator 32. A sheave 36 is rotatably mounted to the tower beneath the curing oven while a capstan 37 is located beside the tower.

In accordance with the invention the optical fiber position detector 31 is coupled by interface electronics with the preform x-y positioner 15. FIG. 3 illustrates the interface electronics as being conventionally comprised of two independent circuits, one for use in maintaining proper x-axis positioning of the fiber and one for maintaining proper y-axis positioning although a single LM 339 integrated circuit (IC) is used for electronic comparisons. The fiber position detector's photodetector for the x-axis is connected with pins 6 and 5 of the IC while its photodetector for the y-axis is connected with pins 8 and 11. Pins 7 and 9 are connected with a +15 VDC power supply through fixed and variable resistors while pins 4 and 10 are connected with a −15 VDC power supply through serially connected fixed and variable resistors. The outputs of the four comparators 40, 41, 44 and 45 are coupled with the −x, +x, −y and +y inputs of the drivers of motors 16 and 20, respectively as shown.

In operation the optical fiber preform 11 is slowly fed into the furnace 22 where it is heated so as to cause the bottom portion of the preform to become molten from which fiber is drawn under some 20 gms of tension. The fiber 10 is drawn down through the bottom of the furnace past the position sensing photodetector and then through the coating applicator 32 where it is coated with a thin film, e.g. 80 microns radially thick, with a uv curable ethyl acrylate coating material. After the fiber passes through the bottom of the coating applicator it is directed through the curing oven 35 which cures the coating. The fiber is then routed about the sheave 36 and drawn by capstan 37 to an unshown takeup spool.

As the fiber passes through the position sensing photodetector bipolar signals are emitted from each of its photodetectors to the interface electronics. As shown in FIG. 3 the output from the x-axis sensor is fed to pin 6 of the LM339 integrated circuit here functioning as analog comparator 40. Pin 7 of this comparator is connected to a 100 ohm potentiometer that is connected in series with 150K ohm resistor between ground and a +15 VDC power supply. The output from the x-sensor is also connected to pin 5 of the IC integrated circuit, here functioning as analog comparator 41, whose pin 4 is similarly connected to a 100 ohm potentiometer that is connected in series with the 150K ohm resistor between ground and −15 VDC power supply. The potentiometers here establish dead zones to provide a small range of plus or minus signal values that are ignored. Should, for example, a minus voltage exists between pins 6 and 7 the comparator outputs a signal from pin 1 causing motor 20 to drive the x-slide in a direction opposite that from the fiber off axis position detected by the photodetector. This continues until the preform is moved in this x-direction sufficiently to bring the fiber back into the dead zone whereupon the comparator ceases to have a minus voltage across pins 6 and 7 and switches its output signal to the drive-inactive state. Conversely, should a plus voltage be outputted from the x-sensor the comparator 41 drives the x-slide in the opposite direction until the fiber is returned sufficiently close to its preselected path as to cause the electronics to enter the dead zone value. Similarly, for the y-sensor the comparator 44 serves to drive motor 16 in one direction in moving the y-slide while the comparator 45 moves the motor 16 in the opposite direction.

The above action serves to maintain the fiber 10 moving substantially along the preselected linear path extending beneath the furnace 22 through the coating applicator and to the pulley 36. As the point of the fiber emergence from the preform drifts about the detector 31 detects the corresponding movement of the fiber off of its preselected linear path. Once it moves beyond a selected threshold distance, as established electronically by the dead zones, the x-y translator repositions the preform sufficiently to bring the fiber back to its preselected path. In this manner the fiber is maintained travelling substantially along its preselected axis and the linear path extending between the periphery of the pulley 36 and the preform through the coating applicator.

It should be understood that the just described embodiment merely illustrates principles of the invention in one preferred form. Many modifications, additions and deletions may, of course, be made thereto without departure from the spirit and scope of the invention as set forth in the following claims.

What is claimed is:

1. A method of guiding an optical waveguide fiber being drawn from an optical waveguide fiber preform comprising the steps of sensing an actual position of the fiber, comparing the sensed position with a preselected position located along a preselected path of fiber travel, and moving the preform in response to deviations in the sensed position from the preselected position so as to maintain the fiber travelling substantially along the preselected path.

2. The optical waveguide fiber draw guiding method of claim 1 wherein the optical fiber preform is suspended from a preform holder, and wherein the preform is moved by movement of the preform holder.

3. The optical waveguide fiber draw guiding method of claim 2 wherein the optical fiber is suspended from the preform holder downwardly into a furnace where it is heated, and wherein the sensed actual position of the fiber is compared with a preselected position located along the preselected path of fiber travel beneath the furnace.

4. The optical waveguide fiber draw guiding method of claim 2 wherein the preform is moved by movement of the preform holder in a plane oriented substantially normal to the preselected path of fiber travel.

5. The optical waveguide fiber draw guiding method of claim 3 wherein the preform is moved distances substantially equal to but in a reciprocal direction from the sensed deviations.

6. The optical waveguide fiber draw guiding method of claims 1, 2, 3 or 4 wherein the fiber is drawn through a tubular coating applicator mounted coaxially about the preselected path of fiber travel beneath the preselected position.

7. A method of uniformly coating an optical waveguide fiber comprising the steps of positioning an elongated glassy optical fiber preform in an upright orientation; heating the preform; drawing fiber from the bottom of the heated preform and passing the drawn fiber through a tubular coating applicator located beneath the preform; sensing the position of the fiber being drawn from the preform; and repositioning the preform in response to sensed deviations in fiber position from along a preselected path that extends through the tubular coating applicator along the applicator axis so as to return the drawn fiber to the preselected path and thereby maintain its travel through the coating applicator substantially along the applicator axis.

8. The method of coating an optical waveguide fiber of claim 7 wherein the optical fiber preform is suspended from a preform holder in an upright orientation and wherein the optical fiber preform is repositioned by movement of the preform holder.

9. The method of coating an optical waveguide fiber of claim 8 wherein the optical fiber preform is repositioned by movement of the preform holder in a generally horizontal plane.

10. The method of coating an optical waveguide fiber of claim 7 wherein the position of the fiber is sensed at a location between the preform and coating applicator.

11. Apparatus for guiding an optical waveguide fiber as it is drawn from a heated optical fiber preform and with the apparatus comprising, in combination, means for sensing an actual position of the fiber, means for comparing the sensed position with a preselected position located along a preselected path of fiber travel, and means for repositioning the preform in response to deviations in the sensed position from the preselected position so as to maintain the fiber travelling substantially along the preselected path.

12. Apparatus for uniformly coating an optical waveguide fiber as it is drawn from an optical fiber preform comprising, in combination, tubular applicator means for applying liquid coating material to the fiber as it passes therethrough; means for sensing the position of the fiber as it is drawn from the preform; and means for repositioning the preform in response to sensed deviations in fiber position from along a preselected path that extends through the tubular coating applicator along the applicator axis to return the drawn fiber to the preselected path and thereby maintain its travel through the coating applicator substantially along the applicator axis.

13. Optical waveguide fiber guiding apparatus in accordance with claim 12 wherein said repositioning means comprises collet means to which an x-y translator is coupled for holding the optical fiber preform.

* * * * *